Patented Nov. 4, 1947

2,430,432

UNITED STATES PATENT OFFICE 2,430,432

PRODUCTION OF GASES CONTAINING HYDROGEN AND CARBON MONOXIDE

Milton M. Marisic, Woodbury, N. J., assignor to Socony-Vacuum Oil Company, Incorporated, a corporation of New York No Drawing. Application April 19, 1944, Serial No. 531,816

5 Claims. (Cl. 23—212)

This invention relates to catalytic processes of hydrogenation. Specifically, the invention is concerned with processes of hydrogenation and dehydrogenation wherein the reaction is carried out in the presence of a novel catalyst described hereinafter.

A great deal of information is available on catalytic hydrogenation and dehydrogenation, it being generally recognized that the activity of a catalyst for hydrogenation is of the same order as its activity for dehydrogenation. The nature of the compositions which will catalyze these reactions has also been extensively investigated. Among the better hydrogenation-dehydrogenation catalysts may be mentioned the metallic elements typified by the eighth group of the periodic table, i. e., iron, cobalt and nickel and other easily reducible metal oxides, e. g., copper. Oxides and sulfides of metals of sixth and seventh groups of the periodic table are also effective for hydrogenation and dehydrogenation reactions. For many reactions, these catalytic agents have been supported on porous carriers of various kinds to increase the surface of the catalyst.

According to my present invention, hydrogenation and dehydrogenation catalysts are prepared by depositing catalytically active metals, oxides and sulfides on porous glass, which may advantageously be formed by the process described in U. S. Patent No. 2,106,744, issued February 1, 1938, to Hood et al. Porous glass has been heretofore suggested as a catalyst carrier for various catalytic reaction wherein the porous glass acts as a surface extender to provide large catalyst surface areas. My results demonstrate that when a catalytically-active substance capable of activating hydrogenation and dehydrogenation reactions is deposited on porous glass, the catalytic activity of the resulting composite is much greater than can be attributed to provision of large surface areas alone. It is apparent that the silica skeleton of porous glass has some influence either on the catalytic deposit or on the hydrogenation-dehydrogenation type of reaction.

My invention is particularly concerned with conversion of a mixture of methane and steam to hydrogen and oxides of carbon by contacting said mixture with metals of the class consisting of nickel, cobalt and iron deposited on porous glass at temperatures of about 1000° F. to about 1900° F.

Impregnation of porous glasses with hydrogenation metals such as nickel, cobalt, etc., results in catalysts which are better hydrogenation catalysts than the corresponding impregnated silica gels. The porous glasses are also more rugged and can withstand higher temperatures for long periods of time with little change in physical properties.

The porous glasses such as boro-silicate glasses may be impregnated with catalytic metals by soaking in solutions of metal salts, which can be decomposed by heat or chemical means and subsequently reduced to the metallic state. Evaporation of metals in high vacua and condensation within the porous structure affords another appropriate method. Metal carbonyls such as nickel carbonyl, iron carbonyl, etc., may be decomposed on the porous glass surfaces to yield excellent metallic catalysts.

Various promoters, stabilizers, activators, etc., may be incorporated into the porous glass during, before or after impregnation with the catalytic metals. Materials such as $Li_2O$, $MgO$, $Al_2O_3$, $ZrO_2$, $SnO_2$, $MoO_3$, $V_2O_5$, etc., have been found to be especially effective for this purpose.

EXAMPLE

A glass having the composition of 75% silica, 5% $Na_2O$ and 20% $B_2O_3$ was prepared in the conventional manner and formed into cylindrical pellets by drawing into tubes 4 mm. in diameter and cutting into 4 mm. sections. The glass pellets were heat treated at 1050° F. overnight, cooled and extracted with one normal hydrochloric acid until substantially all of the acid-soluble phase of the glass was present in the acid solution. The pellets were washed with water until free of soluble matter and then soaked overnight in a 30% solution of nickel nitrate. The nickel nitrate solution was drained off and the pellets were dried at 180° F. and gradually heated to 1200° F. at which temperature they were reduced with hydrogen for a period of four hours.

This catalyst was tested in the conversion of methane and steam to oxides of carbon and hydrogen. Water vapor and methane in the volume ratio of 2 to 1 were preheated and passed over the catalyst at a space velocity of 310 at the temperatures noted in the table below. Space velocity is defined as the volume of water vapor and methane at room temperature passed over unit volume of catalyst per hour. The reaction products were analyzed for carbon monoxide, carbon dioxide, hydrogen and unreacted methane. Data for the reaction of steam and methane at similar conditions in the presence of conventional catalysts also are tabulated below.

Table

| Catalyst | Reaction Temperature, °F. | Reaction Products, Per Cent | | | |
|---|---|---|---|---|---|
| | | $CH_4$ | $CO$ | $CO_2$ | $H_2$ |
| Nickel on Porous Glass | 1,200 | 14.6 | 13.5 | 5.0 | 66.9 |
| | 1,500 | 8.1 | 20.4 | 2.2 | 69.3 |
| Nickel Shot | 1,620 | 60.8 | 9.4 | 2.0 | 27.8 |
| | 1,725 | 9.4 | 20.7 | 4.3 | 65.6 |
| Nickel Helices | 1,525 | 57 | 7.0 | 6.0 | 30 |
| | 1,725 | 13.7 | 18.6 | 4.3 | 63.4 |
| | 1,810 | -4.7 | 20.4 | 4.3 | 70.6 |
| Nickel on Silica Gel | 1,210 | 17.7 | 7.4 | 10.4 | 64.5 |
| | 1,300 | 18.0 | 10.2 | 7.9 | 63.9 |
| | 1,400 | 23.0 | 9.0 | 7.2 | 60.8 |

I claim:

1. In the catalytic conversion of methane and steam to hydrogen and oxides of carbon, the improvement comprising subjecting a mixture of methane and steam at temperatures of about 1000° F. to about 1900° F. to contact with a catalyst produced by effecting separation of a glass, the composition of which lies in a limited region of the ternary system alkali metal oxide-boric oxide-silicon dioxide, said region comprising compositions which will separate by heat treatment into two phases, one of which is easily soluble and the other insoluble in acid solution; the separation of said glass being made into phases relatively rich in silica and relatively poor in silica by heat treating said glass at an elevated temperature, extracting the phase relatively poor in silica with acid, water washing the treated glass until free of soluble matter and effecting deposition in the resulting porous material of a metal from the group consisting of nickel, cobalt, and iron whereby the amount of carbon dioxide produced by said contact is at a minimum and the carbon monoxide-hydrogen yield is substantially increased as compared with that obtained at a corresponding temperature by reaction of methane and steam in the presence of other hydrogenation-dehydrogenation catalysts.

2. In the catalytic conversion of methane and steam to hydrogen and oxides of carbon, the improvement comprising subjecting a mixture of methane and steam at temperatures of about 1000° F. to about 1900° F. to contact with a catalyst produced by effecting separation of a glass having a composition of about 75% silica, about 5% alkali metal oxide and about 20% $B_2O_3$ into phases relatively rich in silica and relatively poor in silica by heat treating said glass at an elevated temperature, extracting the phase relatively poor in silica with acid, water washing the treated glass until free of soluble matter and effecting deposition in the resulting porous material of a metal from the group consisting of nickel, cobalt, and iron whereby the amount of carbon dioxide produced by said contact is at a minimum and the carbon monoxide-hydrogen yield is substantially increased as compared with that obtained at a corresponding temperature by reaction of methane and steam in the presence of other hydrogenation-dehydrogenation catalysts.

3. In the catalytic conversion of methane and steam to hydrogen and oxides of carbon, the improvement comprising subjecting a mixture of methane and steam at temperatures of about 1000° F. to about 1900° F. to contact with a catalyst produced by effecting separation of a glass having a composition of about 75% silica, about 5% $Na_2O$ and about 20% $B_2O_3$ into phases relatively rich in silica and relatively poor in silica by heat treating said glass at an elevated temperature, extracting the phase relatively poor in silica with acid, water washing the treated glass until free of soluble matter and effecting deposition of nickel in the resulting porous material whereby the amount of carbon dioxide produced by said contact is at a minimum and the carbon monoxide-hydrogen yield is substantially increased as compared with that obtained at a corresponding temperature by reaction of methane and steam in the presence of other hydrogenation-dehydrogenation catalysts.

4. In the catalytic conversion of methane and steam to hydrogen and oxides of carbon, the improvement comprising subjecting a mixture of methane and steam at temperatures of about 1000° F. to about 1900° F. to contact with a catalyst produced by effecting separation of a glass having a composition of about 75% silica, about 5% alkali metal oxide and about 20% $B_2O_3$ into phases relatively rich in silica and relatively poor in silica by heat treating said glass at an elevated temperature, cooling, extracting with a dilute aqueous solution of hydrochloric acid substantially all of the acid-soluble phase of the glass, water washing the treated glass until free of soluble matter and soaking the resulting porous material in a solution of a nickel salt, draining, drying, and finally reducing the nickel salt on said material to effect a deposition of nickel thereon whereby the amount of carbon dioxide produced by said contact is at a minimum and the carbon monoxide-hydrogen yield is substantially increased as compared with that obtained at a corresponding temperature by reaction of methane and steam in the presence of other hydrogenation-dehydrogenation catalysts.

5. In the catalytic conversion of methane and steam to hydrogen and oxides of carbon, the improvement comprising subjecting a mixture of methane and steam at temperatures of about 1000° F. to about 1900° F. to contact with a catalyst produced by effecting separation of a glass having a composition of about 75% silica, about 5% $Na_2O$ and about 20% $B_2O_3$ into phases relatively rich in silica and relatively poor in silica by heat treating said glass at an elevated temperature, cooling, extracting with one normal hydrochloric acid substantially all of the acid-soluble phase of the glass, water washing the treated glass until free of soluble matter and soaking the resulting porous material in a 30% solution of nickel nitrate, draining, drying at about 180° F. and gradually heating to about 1200° F. at which temperature reduction with hydrogen was carried out to effect deposition of nickel on said material whereby the amount of carbon dioxide produced by said contact is at a minimum and the carbon monoxide-hydrogen yield is substantially increased as compared with that obtained at a corresponding temperature by reaction of methane and steam in the presence of other hydrogenation-dehydrogenation catalyst.

MILTON M. MARISIC.

REFERENCES CITED

The following references are of record in the file of this patent:

UNITED STATES PATENTS

| Number | Name | Date |
|---|---|---|
| 1,863,681 | Al | June 21, 1932 |
| 1,968,063 | Woodhouse | July 31, 1934 |
| 2,106,744 | Hodd et al. | Feb. 1, 1938 |
| 2,355,753 | Roberts | Aug. 15, 1944 |
| 2,383,715 | De Jahn | Aug. 28, 1945 |